United States Patent
Yu

(10) Patent No.: US 6,402,234 B1
(45) Date of Patent: Jun. 11, 2002

(54) MEANS FOR AVERTING LATERAL MOVEMENT OF BICYCLE SADDLE SUPPORTING FRAME

(76) Inventor: Tsai-Yun Yu, No. 1-2, Lane 1147, Sec. 1, Chung San Road, Ta Chia Chien, Taichung Hsien (TW)

( * ) Notice: Subject to any disclaimer, the term of this patent is extended or adjusted under 35 U.S.C. 154(b) by 0 days.

(21) Appl. No.: 09/234,460

(22) Filed: Jan. 21, 1999

(51) Int. Cl.$^7$ ................................................ B60N 2/38
(52) U.S. Cl. .................. 297/195.1; 403/399; 248/298.1
(58) Field of Search ............................. 297/195.1, 205, 297/215.14, 440.22, 209, 214, 248; 403/399, 391, 389; 248/300, 230.7, 231.81, 298.1, 295.11

(56) References Cited

U.S. PATENT DOCUMENTS

| | | | | |
|---|---|---|---|---|
| 2,081,047 A | * | 5/1937 | Basch | 403/391 X |
| 2,092,372 A | * | 9/1937 | Goeller | 403/391 X |
| 2,419,393 A | * | 4/1947 | Doyle | 403/391 X |
| 2,821,762 A | * | 2/1958 | Foose | 297/248 X |
| 2,956,108 A | * | 10/1960 | Brenner | 403/391 X |
| 3,188,138 A | * | 6/1965 | Lockshin | 297/248 |
| 3,522,365 A | * | 7/1970 | Dannes | 403/391 X |
| 3,669,491 A | * | 6/1972 | Weslock | 403/391 X |
| 5,190,345 A | * | 3/1993 | Lin | 297/195.1 X |
| 5,242,184 A | * | 9/1993 | Nicholls | 297/195.1 X |
| 5,542,159 A | * | 8/1996 | Schultz et al. | 297/248 X |
| 5,597,202 A | * | 1/1997 | Andersne | 297/195.1 |
| 5,676,420 A | * | 10/1997 | Kuipers et al. | 297/195.1 X |
| 5,769,556 A | * | 6/1998 | Colley | 403/391 X |
| 5,911,473 A | * | 6/1999 | Hill | 297/195.1 |
| 5,927,802 A | * | 7/1999 | Kesinger | 297/195.1 X |

* cited by examiner

Primary Examiner—Peter M. Cuomo
Assistant Examiner—Stephen Vu
(74) Attorney, Agent, or Firm—Browdy and Neimark, P.L.L.C.

(57) ABSTRACT

A bicycle saddle comprises a main body, a supporting frame, and a bracing member. The supporting frame includes two metal bars each having a front section, a midsection and a rear section. The front section is fastened with the underside of a front end of the main body, whereas the rear section is fastened with the underside of a rear end of main body. The two rear sections of the two metal bars of the supporting frame are reinforced by a bracing member for averting lateral movement of the supporting frame at such time when the main body is laterally exerted on by an external force.

5 Claims, 3 Drawing Sheets

MEANS FOR AVERTING LATERAL MOVEMENT OF BICYCLE SADDLE SUPPORTING FRAME

FIELD OF THE INVENTION

The present invention relates generally to a bicycle saddle, and more particularly to a bicycle saddle supporting frame which is provided with a bracing member for preventing the bicycle saddle supporting frame from moving sideway at the time when the saddle is loaded with a weight.

BACKGROUND OF THE INVENTION

As shown in FIG. 1, the conventional bicycle saddle has a main body 1, which has a profile becoming progressively wider from the front end thereof toward the rear end thereof and is supported by a metal frame 2 in such a manner that the underside of the front end of the main body 1 is fastened with a curved portion 3 of the metal frame 2, and that the underside of the rear end of the main body 1 is fastened with two gradually-diverging arms 4. The main body 1 is mounted on a seat post 6 in conjunction with a connection seat 5 which is fastened at one end thereof with the two arms 4 and at other end thereof with the top end of the seat post 6.

Such a conventional form of fastening the bicycle saddle with the bicycle seat post 6 as described above is defective in design in that the metal frame 2 has a propensity to sway to one side, as shown by the dotted lines in FIG. 2, at such time when the corresponding side of the metal frame 2 is exerted on by an external force as shown by an arrow in FIG. 2. It is conceivable that the lateral movement of the bicycle saddle can cause a great deal of discomfort to the hips of a bicyclist. In addition, the lateral movement of the metal frame 2 can result in damage or even crack of fastening portions 8 between the main body 1 and the two arms 4 of the metal frame 2.

SUMMARY OF THE INVENTION

The primary objective of the present invention is therefore to provide a simple and cost-effective technique for overcoming the deficiencies of the conventional bicycle saddle as described above.

The technique of the present invention involves a measure by which two gradually-diverging arms of the bicycle saddle supporting frame are reinforced by a bracing means, which is preferably made of a rigid material. The two arms are reinforced by the bracing means such that the two arms are slightly expandable in opposite directions so as to be fastened with both sides of the underside of the main body of the bicycle saddle. In addition, the bracing means of the present invention is compatible with the bicycle saddles of various sizes in view of the fact that the bracing means enables the distance between the two retaining portions of the two arms to be adjusted.

The objective, features, functions, and advantages of the present invention will be more readily understood upon a thoughtful deliberation of the following detailed description of two preferred embodiments of the present intention with reference to the accompanying drawings.

DETAILED DESCRIPTION OF THE INVENTION

Figure 3:
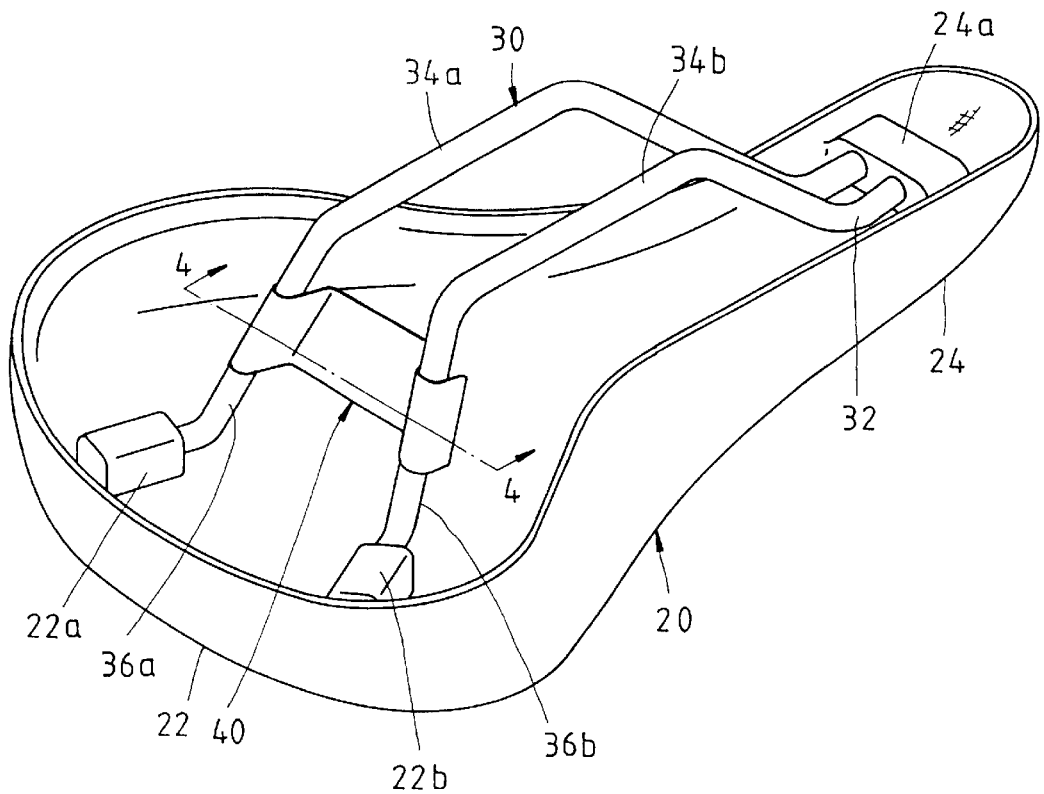
FIG. 3 shows a perspective view of a first preferred embodiment of the present invention in combination.
Figure 4:
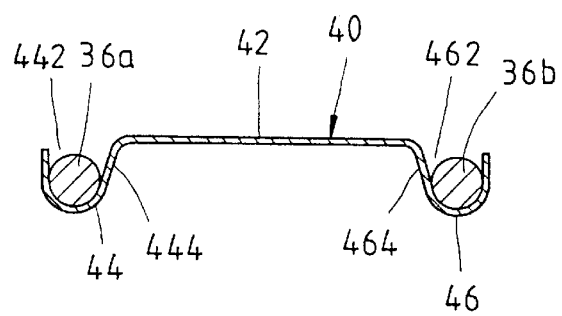
FIG. 4 shows a sectional view of a portion taken along a line 4—4 as shown in FIG. 3.

As shown in FIGS. 3 and 4, a bicycle saddle 10 embodied in the present invention is composed of a main body 20, a supporting frame 30, and a bracing member 40.

The main body 20 is similar in shape to the conventional bicycle saddles such that it has a rear end 22 and a front end 24 smaller in width than the rear end 22.

The supporting frame 30 is made of two metal bars having a circular cross section and is provided with two front sections 32, two midsections 34a and 34b extending from the front sections 32, and two rear sections 36a and 36b extending from the midsections 34a and 34b. The front sections 32 are fastened with a front fastening seat 24a of the main body 20. The rear sections 36a and 36b are fastened with two rear fastening seats 22a and 22b of the main body 20. The distance between the two front sections 32 is smaller than that between the two rear sections 36a and 36b.

Figure 1:
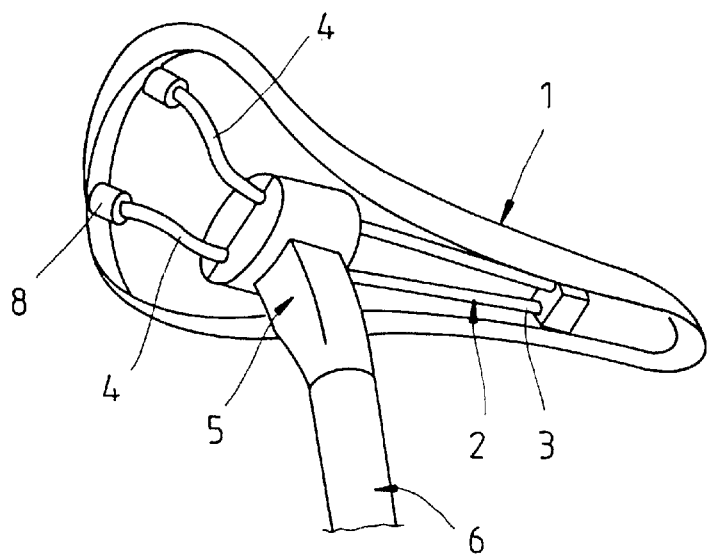
FIG. 1 shows a perspective view of a prior art bicycle saddle mounted on a seat post.
Figure 2:
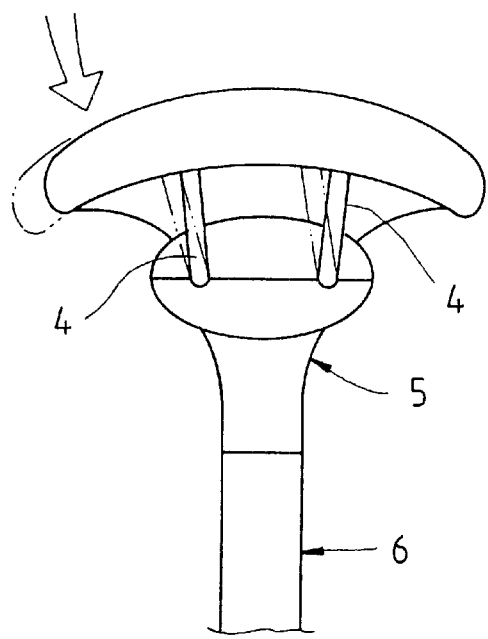
FIG. 2 is a schematic view showing that the prior art bicycle saddle is caused to sway by an external force exerting thereon.

Midsections 34a and 34b are adapted for mounting on a conventional connection seat 5 on the top end of a bicycle seat post 6 in the same manner shown in FIGS. 1 and 2.

The bracing member 40 is made of a metal material and is composed of a body 42 and two retaining portions 44 and 46 extending from both ends of the body 46. The two retaining portions 44 and 46 are provided respectively with a receiving slot 442, 462. The receiving slot 442 has an inner wall 444, whereas the receiving slot 462 has an inner wall 464. Both inner slot walls 444 and 464 extend respectively from both ends of the body 42 such that the inner walls 444 and 464 have an inclination of more than 20 degrees to body 42, and that the open ends of the receiving slots 442 and 462 are greater in width than the bottoms of the receiving slots 442 and 462. The receiving slots 442 and 462 are so dimensioned as to hold securely the rear sections 36a and 36b of the supporting frame 30.

When the bicycle saddle 10 is laterally exerted on by an external force, the retaining portions of the supporting frame 30 and the bracing member 40 form an interference point. In other words, the present invention is provided with more lateral motion interference points than the prior art, thanks to the bracing member 40. As a result, the probability that the bicycle saddle 10 of the present invention swivels laterally is effectively reduced.

Figure 5:
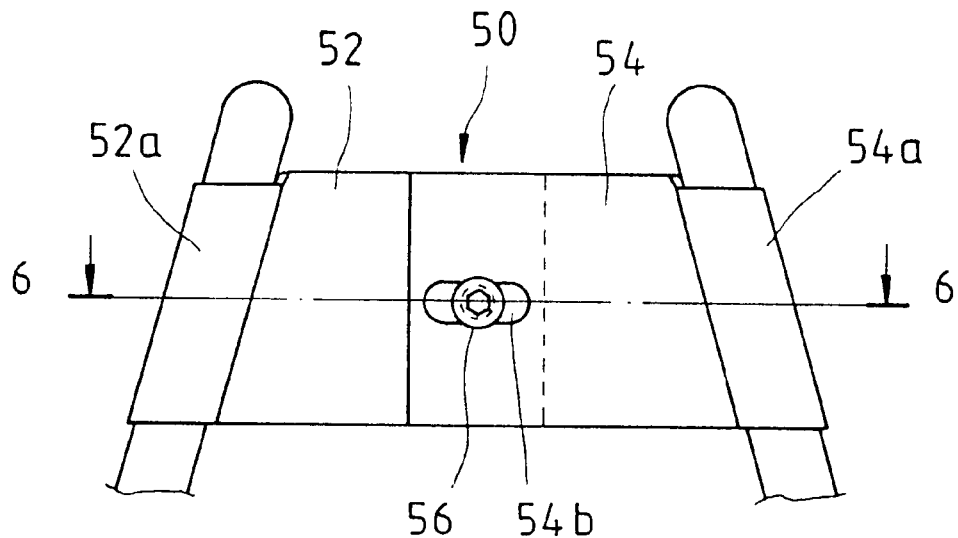
FIG. 5 shows a side view of a second preferred embodiment of the present invention.
Figure 6:
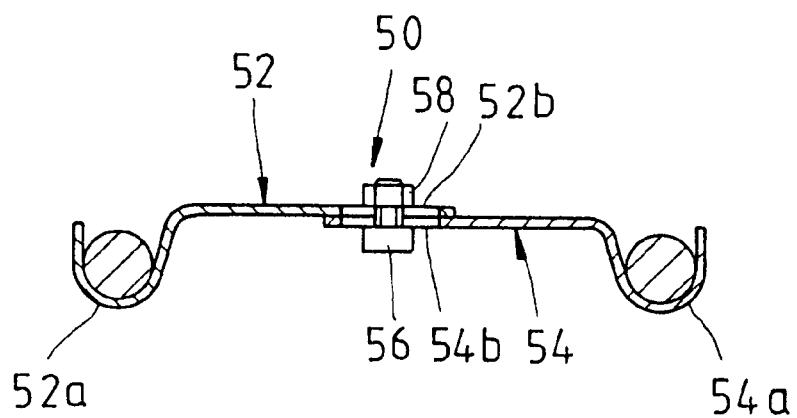
FIG. 6 shows a sectional view taken along the direction indicated by a line 6—6 as shown in FIG. 5.

As shown in FIGS. 5 and 6, a bracing member 50 of another preferred embodiment of the present invention is composed of two bodies 52 and 54, which are respectively provided at one end thereof with a retaining portion 52a, 54a, and at other end thereof with a fastening hole 52b, 54b, which extend along the direction of the longitudinal axes of the bodies 52 and 54. The two bodies 52 and 54 of the bracing member 50 are adjustably fastened together by a bolt 56 and a nut 58. In other words, the bracing member 50 is adjustable in width to fit the main bodies of the bicycle saddles of various sizes.

What is claimed is:

1. A bicycle saddle comprising a main body and a supporting frame on which the main body is mounted, the supporting frame including two metal bars each having a front section, a midsection and a rear section, with the front section being fastened with the underside of a front end of the main body, with the rear section being fastened with the underside of a rear end of the main body and the midsection adapted to be engaged to a connection seat; the two rear sections of the two metal bars of the supporting frame being reinforced by a bracing member engaged to each of the two rear sections; and adapted to be spaced apart from the connection seat;

said bracing member comprising a body having two ends, and two retaining portions extending respectively from said two ends; the two rear sections of the two metal bars of the supporting frame being engaged by said two retaining portions of said bracing member;

wherein said retaining portions of said bracing member are provided with a receiving slot dimensioned to retain securely the rear section of one of the two metal bars of the supporting frame, said receiving slot having an inner wall extending from one of said two ends of said body in such a manner that said inner wall has an angle of inclination to said body;

the angle of inclination being greater than 20°;

wherein said bracing member averts lateral movement of the supporting frame at the time when the main body of the bicycle saddle is laterally exerted on by an external force.

2. The bicycle saddle as defined in claim 1, wherein said bracing member comprises a body having two ends, and two retaining portions extending respectively from said two ends; and wherein the two rear sections of the two metal bars of the supporting frame are engaged by said two retaining portions of said bracing member.

3. The bicycle saddle as defined in claim 2, wherein said retaining portions of said bracing member are provided with a receiving slot dimensioned to retain securely the rear section of one of the two metal bars of the supporting frame, said receiving slot having an inner wall extending from one of said two ends of said body in such a manner that said inner wall has an angle of inclination to said body.

4. The bicycle saddle as defined in claim 1 wherein the body of the bracing member is made in two parts which are adjustably joined together.

5. The bicycle as defined in claim 4, wherein the two parts are adjustably joined together by a bolt which extends through a slot in each of the two parts and not adjustably engaged on the bolt.

* * * * *